(12) United States Patent
Sadhasivan et al.

(10) Patent No.: US 10,129,037 B2
(45) Date of Patent: *Nov. 13, 2018

(54) SYSTEM AND METHOD FOR AUTHENTICATING AND ENABLING FUNCTIONING OF A MANUFACTURED ELECTRONIC DEVICE

(71) Applicant: Anvaya Solutions, Inc., Folsom, CA (US)

(72) Inventors: Sathyamurthi Sadhasivan, El Dorado Hills, CA (US); Shobha Rani Mallarapu, Folsom, CA (US); Srinivas Atluri, Folsom, CA (US)

(73) Assignee: ANVAYA SOLUTIONS, INC., Folsom, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/817,682

(22) Filed: Nov. 20, 2017

(65) Prior Publication Data

US 2018/0091318 A1    Mar. 29, 2018

Related U.S. Application Data

(63) Continuation of application No. 15/425,073, filed on Feb. 6, 2017, now Pat. No. 9,825,766, which is a (Continued)

(51) Int. Cl.
*H04L 29/06* (2006.01)
*H04L 9/32* (2006.01)
*G06F 21/14* (2013.01)

(52) U.S. Cl.
CPC ............ *H04L 9/3278* (2013.01); *G06F 21/14* (2013.01); *H04L 63/061* (2013.01)

(58) Field of Classification Search
CPC .... H04L 9/3278; H04L 9/0866; H04L 63/061
(Continued)

(56) References Cited

U.S. PATENT DOCUMENTS

| 8,402,401 B2 | 3/2013 | Chakraborty |
| 8,516,269 B1 | 8/2013 | Hamlet |

(Continued)

FOREIGN PATENT DOCUMENTS

WO    WO2014178889    6/2014

OTHER PUBLICATIONS

Alkabani, Yousra, and Farinaz Koushanfar, "Active control and digital rights management of integrated circuit IP cores", Proceedings of the 2008 international conference on Compilers, architectures and synthesis for embedded systems, ACM, 2008.

(Continued)

*Primary Examiner* — Syed A Zaidi
(74) *Attorney, Agent, or Firm* — Inventive Law Inc.; Jim H. Salter

(57) ABSTRACT

A system and method for authenticating and enabling functioning of a manufactured electronic device are disclosed. A particular embodiment includes: an obfuscation code generator to produce an obfuscation code having a first portion representing manufacturing or physical characteristics of a particular paired system and a second portion representing one or more identifiers of the particular paired system, the obfuscation code generator to use the obfuscation code to obtain an authentication key; and an obfuscation state machine configured with a pre-defined quantity of state elements, a pre-defined quantity of the state elements being functional state elements, the obfuscation state machine being programmed with the authentication key to cause the obfuscation state machine to transition a protected device from an initial obfuscation state to a functional state, the (Continued)

embedded active obfuscation unit being further configured to load random bit-selected values from the obfuscation code into the obfuscation state machine for the values of the state elements and to load a different set of random bit-selected obfuscation values from the obfuscation code into the obfuscation state machine for the values of the functional state elements of the obfuscation state machine, thereby causing the protected device to transition from the initial obfuscation state through a set of obfuscation states before reaching the functional state for normal operation.

20 Claims, 11 Drawing Sheets

Related U.S. Application Data continuation of application No. 14/716,861, filed on May 19, 2015, now Pat. No. 9,569,601.

(58) Field of Classification Search
USPC .......................................................... 713/171
See application file for complete search history.

(56) References Cited

U.S. PATENT DOCUMENTS

| | | |
|---|---|---|
| 8,848,905 B1 | 9/2014 | Hamlet |
| 8,938,792 B2 | 1/2015 | Koeberl |
| 9,569,601 B2 | 2/2017 | Sadhasivan |
| 9,813,395 B2 | 11/2017 | Sadhasivan |
| 9,825,766 B2 | 11/2017 | Sadhasivan |
| 2006/0209584 A1 | 9/2006 | Devadas |
| 2009/0271877 A1 | 10/2009 | Bradley |
| 2010/0027790 A1 | 2/2010 | Vembu |
| 2010/0127822 A1* | 5/2010 | Devadas ............... H04L 9/3278 340/5.8 |
| 2010/0306544 A1* | 12/2010 | Lionetti .................. H04L 9/083 713/171 |
| 2010/0332852 A1 | 12/2010 | Vembu |
| 2011/0113392 A1 | 5/2011 | Chakraborty |
| 2012/0124393 A1 | 5/2012 | Sethumadhavan |
| 2012/0183135 A1 | 7/2012 | Paral |
| 2013/0156183 A1 | 6/2013 | Komano |
| 2013/0346928 A1 | 12/2013 | Li |
| 2016/0342777 A1 | 11/2016 | Sadhasivan |
| 2016/0344709 A1 | 11/2016 | Sadhasivan |
| 2017/0039364 A1 | 2/2017 | Sadhasivan |

OTHER PUBLICATIONS

Yousra Alkabani, Farinaz Koushanfar, and Miodrag Potkonjak, 2007, "Remote activation of ICs for piracy prevention and digital right management", In Proceedings of the 2007 IEEE/ACM international conference on Computer aided design (ICCAD '07) IEEE Press, Piscataway, NJ, USA, 674-677.

Jarrod A. Roy, Farinaz Koushanfar, and Igor L. Markov, 2008, "EPIC: ending piracy of integrated circuits", In Proceedings of the conference on Design, automation and test in Europe (DATE '08). ACM, New York, NY, USA, 1069-1074.

Anderson, Jason H. "A PUF design for secure FPGA-based embedded systems." Proceedings of the 201 O Asia and South Pacific Design Automation Conference. IEEE Press, 2010.

* cited by examiner

```
Processing Logic for Authenticating and Enabling Functioning of a
           Manufactured Electronic Device
                        -1150-
```

```
Providing a protected device.
            -1160-
```

Providing an embedded and active obfuscation unit including: an obfuscation code generator to make available a device internal specific PUF/ECC or randomly fused data-based obfuscation code, and to provide a separate information procurer to obtain board/system identifier data of a particular paired system, the board/system identifier data representing manufacturing or physical characteristics of the particular paired system; an authentication key retriever to use the board/system identifier data to request an authentication key from an authorized representative in a first external communication, and to use the obfuscation code to request and obtain the authentication key from the authorized representative in a second external communication; and an obfuscation state machine configured with a pre-defined quantity of state elements, a pre-defined quantity of the state elements being functional state elements, the obfuscation state machine being programmed with the authentication key to cause the obfuscation state machine to transition the protected device from an initial obfuscated non-functional state to a functional state.
-1170-

Fig. 10      ( End )

SYSTEM AND METHOD FOR AUTHENTICATING AND ENABLING FUNCTIONING OF A MANUFACTURED ELECTRONIC DEVICE

PRIORITY PATENT APPLICATION

This is a continuation patent application drawing priority from U.S. patent application Ser. No. 15/425,073; filed Feb. 6, 2017; which is a continuation patent application drawing priority from U.S. patent application Ser. No. 14/716,861; filed May 19, 2015. This present patent application draws priority from the referenced patent applications. The entire disclosure of the referenced patent applications is considered part of the disclosure of the present application and is hereby incorporated by reference herein in its entirety.

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the hardware designs, software, and data as described below and in the drawings that form a part of this document: Copyright 2014-2017 Anvaya Solutions, Inc., All Rights Reserved.

TECHNICAL FIELD

This patent application relates to electronic systems, integrated circuit systems, static electronic devices, mobile electronic devices, electronic hardware and device design, electronic device fabrication, and computer-implemented software, according to various example embodiments, and more specifically to a system and method for authenticating and enabling functioning of a manufactured or re-used/refurbished electronic device.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density and complexity of integrated circuits has grown, the threat of unauthorized embedded hardware or software components has also escalated.

With the Time to Market (TTM) expectancy shortening in recent years, much of the microelectronics supply chain continues to be outsourced. Trust in the supply chain has been greatly eroded due to many different acts of piracy. This has raised significant questions about the integrity and authenticity of original Intellectual Property (IP) designs embedded inside an Integrated Circuit (IC) or other electronic device.

The following acts of IP piracy have significantly contributed to the erosion of trust in the IC device supply chain: 1) Counterfeiting where a substandard part, rejected part, or a cannibalized part from a previously used and discarded board is remarked as new and re-introduced into the supply chain; and 2) Overbuilding, where the silicon fab houses overproduce blind copies of the ICs in excess of authorization for their own spurious sale. Conventional technologies have been unable to effectively and efficiently provide defenses against these threats.

BRIEF DESCRIPTION OF THE DRAWINGS

The various embodiments are illustrated by way of example, and not by way of limitation, in the figures of the accompanying drawings in which:

FIG. 10 is a processing flow chart illustrating an alternative embodiment of a method as described herein.

DETAILED DESCRIPTION

Figure 1:
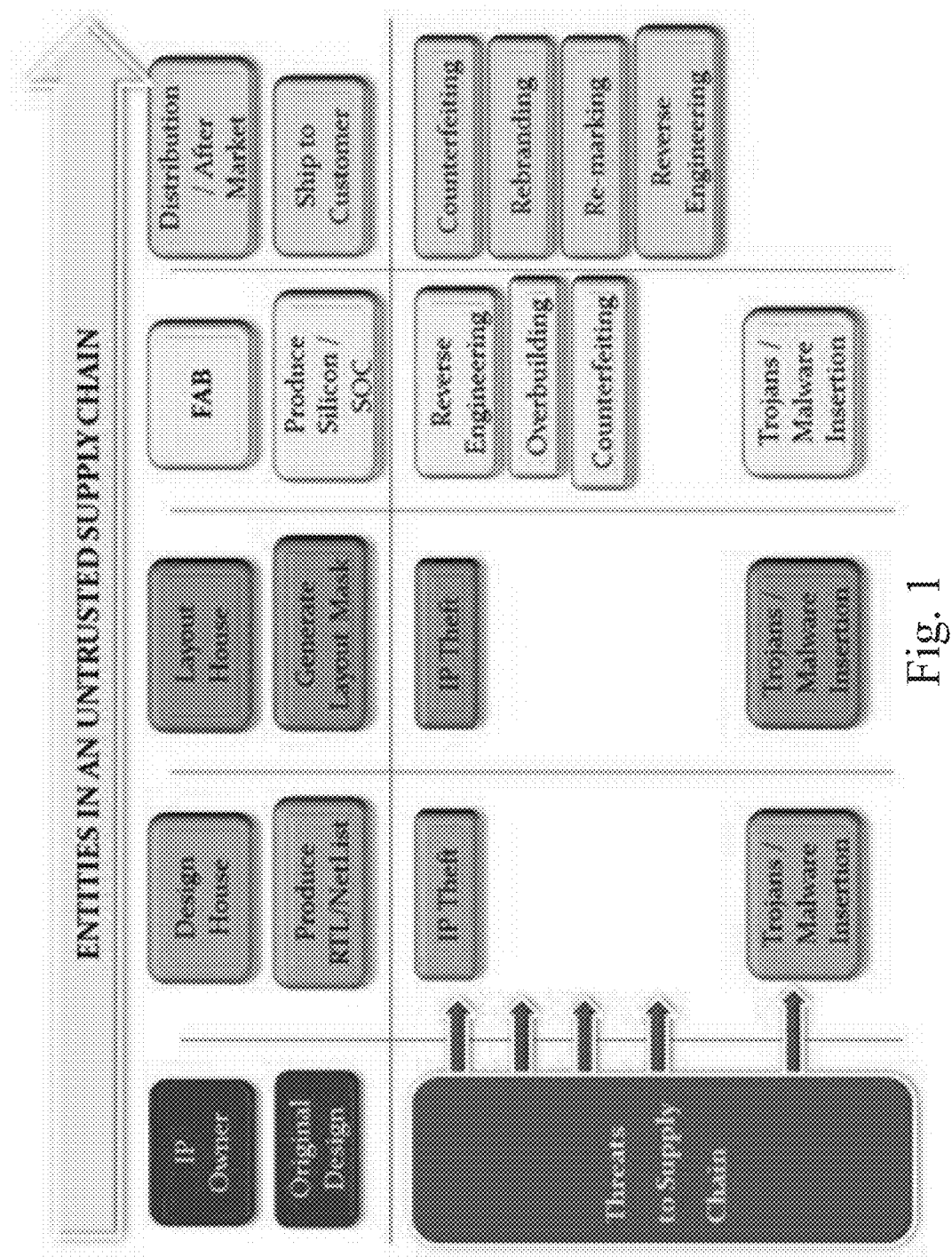
FIG. 1 illustrates, at a high-level, the five basic entities of the microelectronics supply chain performing specific roles in bringing a product to market.

In the following detailed description, a reference is made to the accompanying drawings that form a part hereof, and in which are shown, by way of illustration, specific embodiments in which the disclosed subject matter can be practiced. It is understood that other embodiments may be utilized and structural or process changes may be made without departing from the scope of the disclosed subject matter.

According to various example embodiments of the disclosed subject matter as described herein, there is provided a system and method for authenticating and enabling functioning of a manufactured electronic device. The various embodiments described herein provide an embedded and active obfuscation system and method, which requires authentication of a protected electronic device after manufacturing and prior to any deployment. This inventive system defeats the incorporation of a counterfeit device or an unauthorized overbuilt part into the supply chain. In a particular described embodiment, every protected electronic device needs a one-time authorization and authentication by the Intellectual Property (IP) owner (or other authorized representative) to function correctly on a new board or other system into which the protected electronic device is embedded. Based on the inventive approach offered by the various embodiments described herein, the following advantages can be realized:

Any electronic device protected by the obfuscation technology disclosed herein will be rendered non-functional after manufacturing and prior to authentication. The protected electronic device will require a one-time per board/system authentication by the IP owner (or other authorized representative) for the device to be operationally functional.

Such an authentication cannot be transferred to a different board/system, which therefore prevents unauthorized reuse of the protected device.

Similarly, a counterfeit part deployed for unauthorized reuse remains functionally dead, as it will not be authenticated by the IP owner (or other authorized representative) for such unauthorized reuse.

The active obfuscation system and method described herein eliminates the cumbersome burden of first detecting and then proving a spurious device in play in the supply chain. By use of the obfuscation technology disclosed herein, the producer, fabricator, or the end user of such a spurious device must first contact the IP owner to enable the device to function. By requiring this device authentication prior to use, the possessor of the spurious device is likely to be caught and most likely such an overbuilt/counterfeit device will remain inactive and prevent any damage to the supply chain. The deployment of an overbuilt or counterfeit part into the supply chain itself is thwarted, as such a part is rendered useless until authenticated. The systems and methods of the various embodiments described herein enhance the trustworthiness of the device in play in the supply chain, even as many of the elements in the supply chain remain untrustworthy. This should be compared against the current passive methods where there are no countermeasures to prevent the release of the spurious parts into the supply chain or, their eventual use in an end product (because they slipped through and never got detected). The conventional methods of post-deployment passive detection can therefore result in serious damage, possibly catastrophic damage, once the spurious part is fielded for use.

Referring now to FIG. 1, at a high-level, there are five basic entities of the microelectronics supply chain performing specific roles in bringing a product to market. The top half of the diagram depicts the deliverables of those entities. The bottom half highlights the various threats impacting Intellectual Property (IP) protection and functionality of these product/device deliverables. The trustworthiness of this supply chain, and the ICs in question, has been eroded because of several of the following unsavory and nefarious practices by adversaries:

IP Theft—an unethical entity (e.g., competition, nation state, etc.) copies and steals the Intellectual Property involved in the development of technology and devices. This reduces their research and development (R&D) time and expense.

Counterfeiting—a substandard rejected part, or a cannibalized part from a previously used and discarded board, is re-marked as new and re-introduced into the supply chain.

Overbuilding—the silicon fabrication houses, overproduce blind copies of the ICs in excess of authorization, for their own spurious sale.

Reverse Engineering and Cloning—specific functional design modules inside a device have been copied without permission and spuriously implanted, often with low quality, into other devices and sold for profit.

Malicious Tampering—inserting hardware trojans and malware inside the IC. These spurious backdoor controls are used to steal confidential user/application-specific information stored inside the device during runtime deployment and use.

Rebranding—a different name applied to the original product. For example, a lower performing product can be re-branded and sold as a higher performing product.

Re-marking—the process of disguising the parts for sale that are different from those offered by the original part manufacturer. This is another form of Counterfeiting. For example, package marking and die marking show different manufacturers.

The assurance that an IC or electronic device embedded with the obfuscation techniques disclosed herein will never be enabled to function in an unauthorized manner is an important differentiating factor for the user of the embodiments disclosed herein. Such an expectation is very pronounced and highly demanded in mission critical applications. The same obfuscation technology offers protection against overbuilt or counterfeit parts and thus minimizes the impact to revenue streams for all IP owners. The systems and methods of the various embodiments described herein with its embedded active obfuscation circuitry is uniquely positioned to meet these requirements, compared to the passive detection and tracking methods offered by the conventional technologies. With the systems and methods of the various embodiments described herein, the technology adherence to the AS6081 standard becomes inherent to the device. This provides assurance of trust in the electronic device supply chain.

Figure 2:
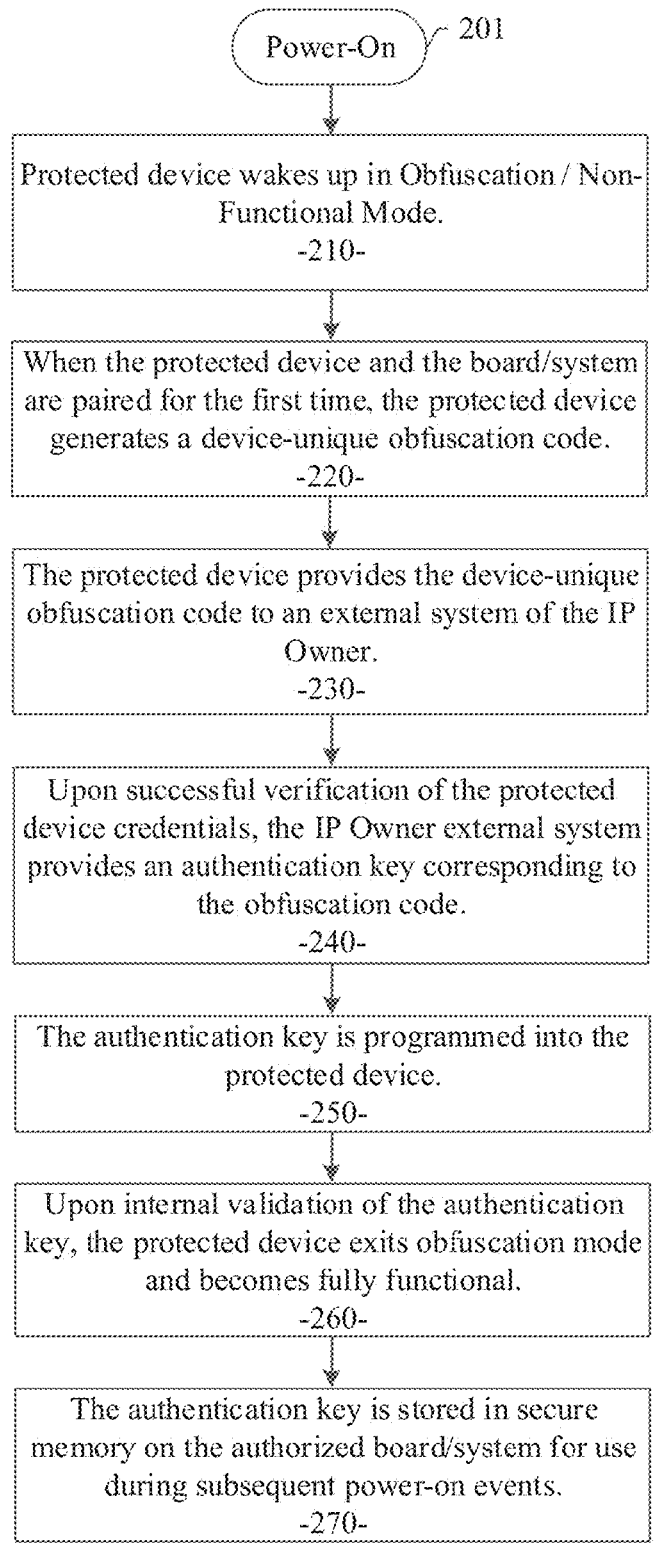
FIG. 2 illustrates a system level operational processing flow of an example embodiment.

Referring now to FIG. 2, the diagram illustrates a system level operational processing flow of an example embodiment. The active obfuscation system and method described herein is active, always-on, and built into the protected electronic system design. The example embodiment allows for the protected electronic device to wake-up on power-on in a non-functional obfuscated mode (see FIG. 2, block 210). As described in more detail below, the example embodiment generates a device and context unique obfuscation code (see FIG. 2, block 220) and uses the obfuscation code to request a corresponding authentication key from an IP owner or authorized representative of the protected electronic device (see FIG. 2, block 230). The authentication key can be provided to the protected electronic device after the IP owner successfully verifies the credentials of the protected electronic device. The authentication key received by the protected electronic device can be used to restore the protected electronic device to a fully operational mode (see FIG. 2, blocks 240-260).

For an authorized use of a protected device on or with a specific board/system, a one-time handshake (e.g., data communication) between an IP owner of the protected device and a device manufacturer/end-user is required to enable the protected device to be functional. In an example embodiment, a physical unclonable function (PUF) device is used to generate a first portion of an obfuscation code used to authenticate the protected device. Physical unclonable function (PUF) devices, sometimes also called physically unclonable functions, are well-known physical entities that can be embodied in a physical structure and provide output that is easy to evaluate, but hard to predict. Further, an individual PUF device is typically easy to make, but practically impossible to duplicate, even given the exact manufacturing process that produced it, in this respect, a PUF device is the hardware equivalent of a one-way function.

In an example embodiment, at power-on, each protected electronic device exhibits a unique per device internal n bit value or code, which represents a first portion of an obfuscation code uniquely associated with the protected device in the particular system. The n bit value or code gets created based on the manufacturing or physical characteristics of a particular board or system into which the protected device is to be embedded. In the example embodiment, the n parameter can be pre-defined, so the length of the first portion of the obfuscation code can be pre-defined. In a particular embodiment, the length of the first portion of the obfuscation code is 84 bits, where n=84. In one example embodiment, the first portion of the obfuscation code can be generated using a delay, or static random access memory (SRAM) based PUF, along with the associated error correcting code logic (ECC). Alternatively, in another example embodiment, the first portion of the obfuscation code can be generated by n bits of fuse, which are randomly programmable per device on the manufacturing floor. It will be apparent to those of ordinary skill in the art in view of the disclosure herein that other equivalent methods can be used to generate a value, unique to a protected device in a particular system, which can represent the first portion of the obfuscation code.

In the example embodiment, a second portion of the obfuscation code can be generated from a combination of one or more other parameters, register contents, data items, or values, including a unique device identifier (ID) associated with the protected device, a unique device manufacturing lot ID, a unique purchase order or contract ID, a unique part ID of the board or system used, a unique time/date stamp of the device manufacture, an ID associated with the geographic location of the manufacture, a unique system context ID, a unique ID of the device manufacturer or IP owner, a digital signature, a watermark, a digital rights management data object or ID, any other device specific information from the manufacturer, and any other design specific information from the IP owner. It will be apparent to those of ordinary skill in the art in view of the disclosure herein that other equivalent values can be used in a combination of values, which can represent the second portion of the obfuscation code.

In the example embodiment, the first portion of the obfuscation code as described above can be combined with the second portion of the obfuscation code as also described above to form a combined obfuscation code, or simply, the obfuscation code (see FIG. 2, block 220). The obfuscation code, as generated by the example embodiment, can represent a unique value associated with the particular protected device in the context of a particular board/system installation and manufacturing parameters. In an example embodiment, the obfuscation code can be a unique 128 bit pattern or value created with the combination component sub-values as described above. In alternative embodiments, the length of the obfuscation code can be lengthened or shortened to conform to a particular implementation. Additionally, the initially generated obfuscation code can be hashed or otherwise processed to produce an obfuscation code with desired characteristics. In an embodiment, the obfuscation code can be stored into secured Basic Input/Output System (BIOS) code, stored into a Tamper Resistant on-board Flash memory device, or stored into a Trusted Platform Module (TPM). In another embodiment, the obfuscation code can be stored into an Obfuscation State Read Only Register. In another embodiment, the obfuscation code is not stored on the board/system, but rather generated in real-time when the board/system is booted up (powered up or restarted).

As described in detail below in connection with a particular example embodiment, obfuscation technology as described herein enables a one-time authentication of the protected device in the context of the particular the board/system installation and manufacturing parameters. When a protected device and a board/system are initially paired and powered up, the example embodiment can perform the one-time authentication process. As an initial part of this process, the obfuscation code is generated as described above. Next, the obfuscation code can be read from the protected device or obfuscation components by an external system. The external system can be a network-connected computer or other separate processing platform. The external system can establish independent data communication with an IP owner or authorized representative associated with the protected device. The external system can send the obfuscation code read from the protected device to a computing system of the IP owner with a request for a device authentication key (see FIG. 2, block 230). Using any of a variety of well-known data processing techniques, the computing system of the IP owner can generate a device-unique authentication key based on the obfuscation code read from the protected device. In a particular example embodiment, the computing system of the IP owner can generate the device-unique authentication key using conventional techniques, such as encryption, steganography, hashing, or other data processing techniques. As a result, a device-unique authentication key based on the device obfuscation code can be generated by the IP owner or authorized representative associated with the protected device. The authentication key can be specific to the protected device in the context of the particular the board/system installation and manufacturing parameters. Thus, the IP owner can control the manufacture and usage of the particular protected device. In an example embodiment, the authentication key can be a 128 bit value derived from the device obfuscation code. In other alternative embodiments, the length of the authentication key can be configured to conform to a particular device/system implementation.

Once the device-unique authentication key is generated by the IP owner or authorized representative as described above, the authentication key can be provided to the protected device and/or obfuscation components in a data communication from the external computing system of the IP owner, after the IP owner successfully verifies the credentials of the protected device (see FIG. 2, block 240). In an example embodiment, the authentication key received from the IP owner can be verified or validated by the protected device to confirm that the received authentication key is authentic. The validated authentication key received from the IP owner can be programmed into the protected device and/or obfuscation components (see FIG. 2, block 250) and used by the obfuscation state machine of the example embodiment to render the protected device functional in the manner described in more detail below (see FIG. 2, block 260). For subsequent retrieval and use of the protected device on the same board/system during subsequent power-on cycles or boot-ups, the returned authentication key from the IP owner can be stored on the authorized board/system, such as stored into secured BIOS code, a Tamper Resistant on-board flash memory, or a Trusted Platform Module (TPM) and loaded from there (see FIG. 2, block 270). A non-resettable "Valid Authentication Key Programmed" flag can be set to indicate the presence of the validly programmed authentication key. In the example embodiment, the data exchange between the protected device and the IP owner occurs only once, at the very first time the protected device is paired with a specific board/system. In the example embodiment, there is no need for a subsequent authentication query exchange between the protected device and the IP owner.

Figure 3:
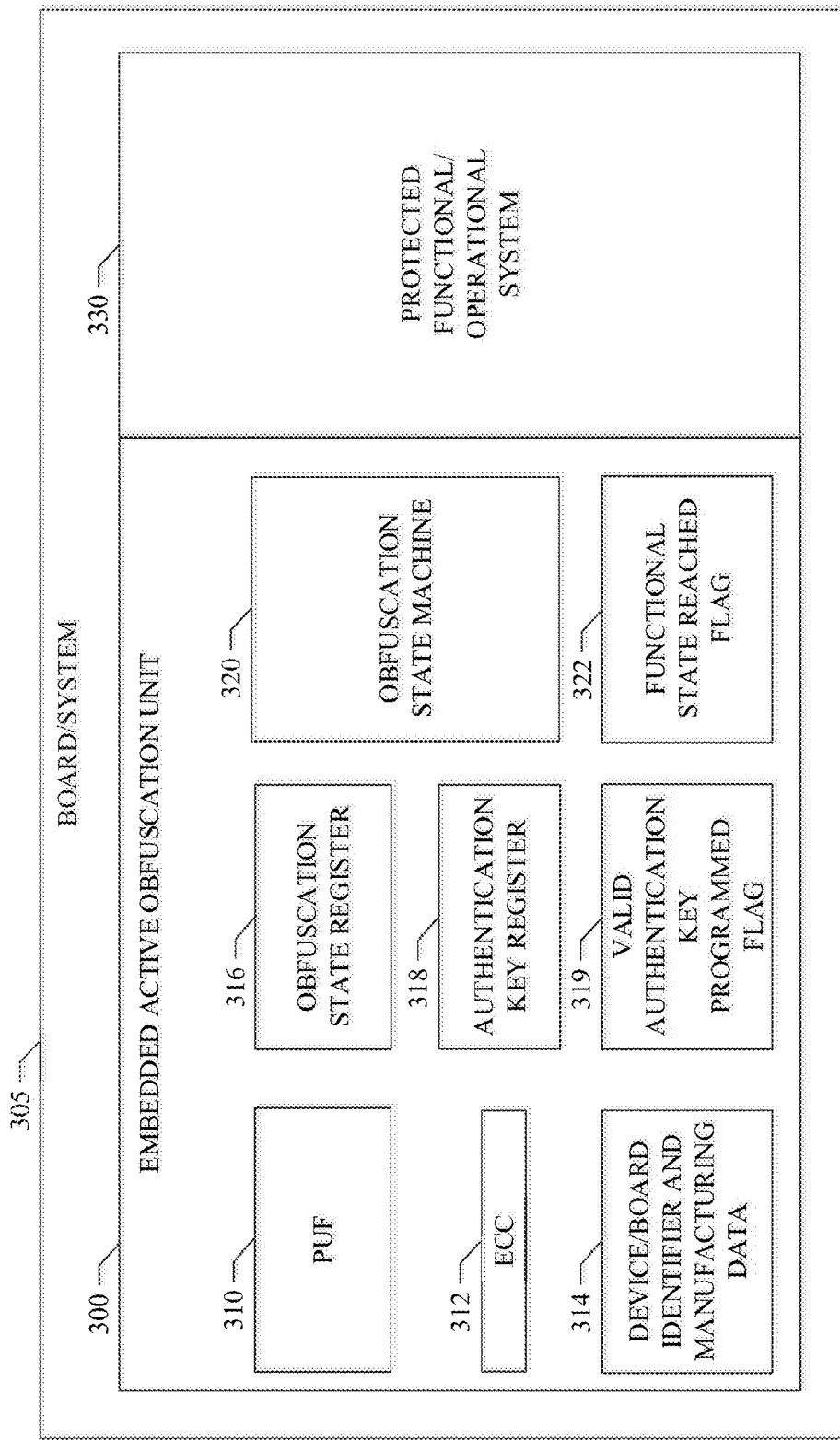
FIG. 3 is an architectural diagram illustrating the functional components provided in the example embodiment.

Referring now to FIG. 3, an architectural diagram illustrates the functional components provided in the example embodiment. In a typical electronic system design, a functional/operational electronic device or system (denoted protected device) 330 for a particular board or system 305 can be developed and defined in a variety of forms. For example, a digital system design can be defined as a Register-Transfer-Level (RTL) abstraction as used in hardware description languages (HDLs) like Verilog and VHDL to create high-level representations of a circuit, from which lower-level representations and ultimately actual wiring can be derived. Design at the RTL level is typical practice in modern digital design. A digital system design, such as functional/operational system 330, can also be defined as a netlist. A netlist describes the connectivity of an electronic design. As such, a single netlist is a list of all the component terminals that should be electrically connected together for the circuit to work. The design of functional/operational system 330 can also be defined in a variety of other forms as well. In any of these design definition forms, the design of functional/operational system 330 can be integrated with or embedded with the design of the embedded active obfuscation unit 300 as described herein in various embodiments. As a result, the embedded active obfuscation unit 300 can be embedded into the design and functionality of the functional/operational system 330 using any of the design definition forms in which the functional/operational system 330 is defined. As a result, the embedded active obfuscation unit 300 and the functional/operational system 330 can be integrated very early in the design process and before the functional/operational system 330 design gets exposed to the threats described above.

Referring still to FIG. 3, the embedded active obfuscation unit 300 of the example embodiment can include a physical unclonable function (PUF) 310 and error correcting code logic (ECC) 312. As described above for an example embodiment, PUF 310 can be used to generate a first portion of the obfuscation code, which is used to authenticate the functional/operational system or protected device 330. In one example embodiment, the first portion of the obfuscation code can be generated using a delay, or SRAM based PUF 310, along with the associated ECC 312.

The embedded active obfuscation unit 300 of the example embodiment can include device/board identifier and manufacturing data component 314. In the example embodiment, a second portion of the obfuscation code can be generated from a combination of one or more other parameters, register contents, data items, or values, retained by the device/board identifier and manufacturing data component 314. These parameters can include a unique device identifier (ID) associated with the protected device, a unique device manufacturing lot ID, a unique purchase order or contract ID, a unique part ID of the board or system used, a unique time/date stamp of the device manufacture, an ID associated with the geographic location of the manufacture, a unique system context ID, a unique ID of the device manufacturer or IP owner, a digital signature, a watermark, a digital rights management data object or ID, any other device specific information from the manufacturer, and any other design specific information from the IP owner.

Referring still to FIG. 3, the embedded active obfuscation unit 300 of the example embodiment can include an obfuscation state register 316 and an authentication key register 318. The obfuscation code, as generated by the example embodiment, can represent a unique value associated with the particular protected device in the context of a particular board/system installation and manufacturing parameters. In an example embodiment, the obfuscation code can be a unique 128 bit pattern or value created with the combination of component sub-values as described above. In one embodiment, the obfuscation code can be stored into obfuscation state register 316 and is regenerated every time at power-on for use. The device-unique authentication key is generated by the IP owner or authorized representative based on the device obfuscation code as described above. The authentication key can be provided to the protected device via an external system. Once the device-unique authentication key is received by the embedded active obfuscation unit 300, the authentication key can be stored in authentication key register 318, which is secured with BIOS code, stored in an encrypted fashion either into a Tamper Resistant on-board Flash memory device, or into a Trusted Platform Module (TPM). The stored authentication key can be retrieved and used on the same board/system during subsequent power-on cycles or boot-ups of the protected device 330.

Referring still to FIG. 3, the embedded active obfuscation unit 300 of the example embodiment can include an obfuscation state machine 320, a valid authentication key programmed flag 319, and a functional state reached flag 322. As described in more detail below, the embedded active obfuscation unit 300 can use the authentication key to cause the obfuscation state machine 320 to transition through a pre-defined sequence of obfuscation (non-functional states) states to reach a functional reset state, which enables the protected device 330 to enter a functional or operational mode. Once this functional or operational mode is reached, the functional state reached flag 322 can be set to indicate the active functional state. This flag enables the protected device 330 to verify that the proper device authentication process has been completed successfully and that the device is in a normal functional mode.

Figure 4:
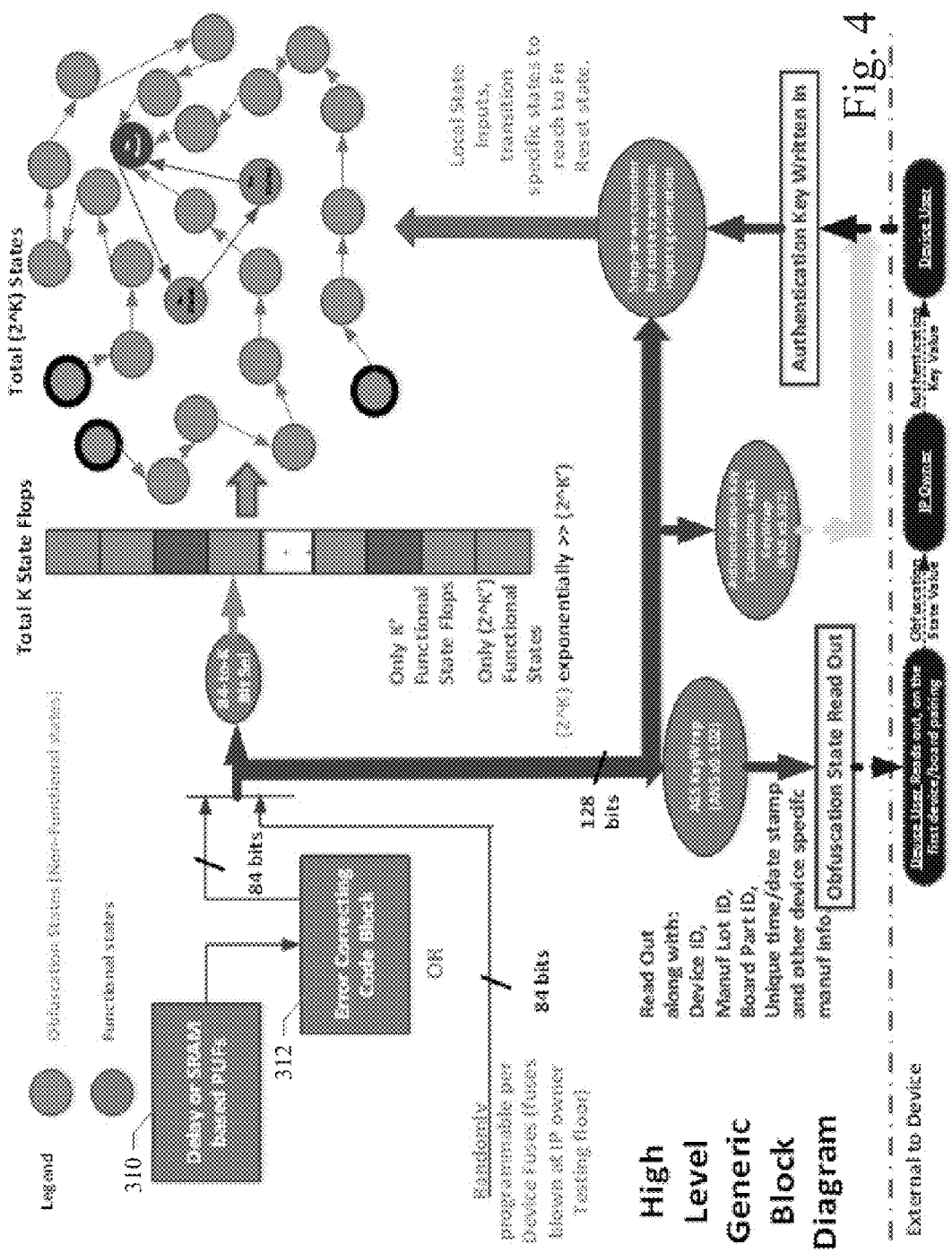
FIG. 4 is a high level block diagram illustrating the functional components and processes provided in the example embodiment.

Referring now to FIG. 4, a high level block diagram illustrates the functional components and processes provided in the example embodiment. As shown, the example embodiment includes the physical unclonable function (PUF) 310 and error correcting code logic (ECC) 312. As described above for an example embodiment, PUF 310 can be used to generate a first portion of the obfuscation code, which is used to authenticate the protected device 330. In one example embodiment, the first portion of the obfuscation code can be generated using a delay, or SRAM based PUF 310, along with the associated ECC 312. In the example embodiment, the PUF 310 can generate a unique but consistent PUF based ID for each electronic device. The unique PUF value can be generated using device manufacturing or physical characteristics, which produce unique internal path delays leading to unique storage values in internal storage elements. The PUF 310 can be a Delay-Arbiter type based device, or can be based on the aggregation of un-initialized wake-up contents of all the storage cells of an on-chip SRAM. Alternatively, in another example embodiment, the first portion of the obfuscation code can be generated by n bits of fuse, which are randomly programmable per device on the manufacturing floor. This alternative embodiment is shown in the bottom left portion of FIG. 4. In the example embodiment shown, 84 fuse wires can be used to program a random value for each protected device, thus providing ($2^{84}$) unique device IDs. For the integrity of this approach, the fuse programming/blowing can be performed at a silicon testing facility within the IP owner's control, using a true entropy seed feeding into a pseudo-random number generator.

As described above, the second portion of the obfuscation code can be generated from a combination of one or more other parameters, register contents, data items, or values, retained by the device/board identifier and manufacturing data component 314. The first portion of the obfuscation code from the PUF/fuse function can be augmented with the second portion of the obfuscation code comprising several other device and board specific manufacturing parameters to create the obfuscation code representing a native wake-up obfuscation state signature of the device. In an example embodiment, the obfuscation code can be a 128 bit value to enable encryption. It will be apparent to those of ordinary skill in the art in view of the disclosure herein that the obfuscation code can be any desired length as needed for particular applications. This obfuscation code can be read out by an external user system on the first pairing of the protected device and the board/system. The obfuscation code may optionally be further encrypted, if required, using standard encryption methods before the obfuscation code is read out.

The information retained by the device/board identifier and manufacturing data component 314 and used for the second portion of the obfuscation code can be used by the IP owner for several reasons. First, the reporting of the unique device ID by the manufacturer/device user, by itself, can be used to update the manufactured silicon count and thus to thwart any overbuilding attempt by a fabrication house. Secondly, once the pairing of the protected device to a board/system is reported, any future pairing of the same device (ID) with another board/system can be further investigated to determine if the new usage is for a remarked counterfeit part usage attempt. Then, such an entry of a counterfeit part into the supply chain can be prevented. A legitimate use of a refurbished part on a new board/system by an authorized supplier, will however, be approved by the IP owner with a new authentication after checking the certified credentials of the authorized supplier.

Referring to the lower portion of FIG. 4, once the obfuscation code is generated as described above, the user of the protected device can use an external system to forward the generated obfuscation code to a system of the IP owner with a request for an authentication key. In the example embodiment, the external system of the protected device user can communicate with the IP owner's system via a generic web-based secure protocol.

Referring to the lower right portion of FIG. 4, in response to the receipt of the obfuscation code and the request for an authentication key from the external system of the protected device user, the IP owner will first verify the device user supplied credentials and establish the trust of the device. Based on the device trust validation, the IP owner can generate and send the corresponding authentication key to the system of the protected device user through the same secure web protocol. In a particular embodiment, the data communication between the protected device user system and the IP owner system can be an encrypted 128 bit data transmission for added security. Upon receipt of the authentication key at the protected device, the authentication key can be programmed into the obfuscation state machine 320 of the embedded active obfuscation unit 300. In the example embodiment, the authentication key serves as the unique key to unlock the functionality of the specific protected device 330. Because the authentication key is derived from the device-unique obfuscation code as described above, the authentication key has a direct relationship with the unique wake-up protocol and the unique obfuscation state of the protected device 330.

Referring to the upper right portion of FIG. 4, the embedded active obfuscation unit 300 can use the previously generated obfuscation code to populate a pre-defined quantity of state elements (denoted state flops in FIG. 4) for obfuscation state machine 320. Each state element can represent an obfuscation (non-functional) state or a functional state of the protected device 330. In the example embodiment, the obfuscation unit 300 can select a portion of the obfuscation code, the length of which corresponds to the pre-defined quantity of state elements. In a particular embodiment shown in FIG. 4, the pre-defined quantity of state elements is k, which can be a variable number of state elements designed to meet security requirements. As such, the obfuscation unit 300 can select k bits from the obfuscation code to represent the portion of the obfuscation code that corresponds to the k state elements as shown in FIG. 4. In a particular embodiment, the k bits can be selected from random bits of the obfuscation code field. In other embodiments, a particular bit selection pattern can be used. In the example embodiment, a pre-defined quantity (kf or k') of the k state elements can correspond to functional state elements of the protected device 330. The remaining quantity (k−kf=ko) of the k state elements can correspond to obfuscation or non-functional state elements of the protected device 330. It is desired that the quantities k and ko be substantially greater than the quantity kf so the functional states can be well hidden among a huge plurality of obfuscation or non-functional states of the protected device 330. In a particular embodiment, the value k can be three to twelve orders of magnitude greater than the value of kf, the quantity of functional state elements. In the example embodiment, the pre-defined quantity of functional state elements, kf, can be driven by design.

In the example embodiment, the k bits selected from the obfuscation code by the obfuscation unit 300 can be loaded into the k state elements of the obfuscation state machine 320. In a particular embodiment, the k bits selected from the obfuscation code by the obfuscation unit 300 can be loaded into Boosted State Transition Graph (BSTG) flip-flops (e.g., state elements) of the obfuscation state machine 320. As a result of the k state elements of the obfuscation state machine 320 being loaded with the portion of the obfuscation code as described above, the obfuscation state machine 320 is configured to define a total of $2^k$ states. Given the quantity kf of functional state elements as described above, the obfuscation state machine 320 is also thereby configured to define a total of $2^{kf}$ functional states. As explained above, the quantity of total states $2^k$ is substantially greater than the quantity of functional states $2^{kf}$ in the obfuscation state machine 320.

Because the content of the obfuscation code for a particular system can be controlled by the configuration of the PUF 310 and the other components of the obfuscation code, the content of the obfuscation code can be configured to cause the obfuscation state machine 320 to initially enter an obfuscation or non-functional state. Given the initial obfuscation state, the protected device 330 will start up on power-up or reset in an initial obfuscation state. As such, the protected device 330 is forced to transition through a pre-defined set of obfuscation states before reaching a functional state for normal operation As described above, the obfuscation state machine 320 can be configured with $2^k$ total states in k state elements and a substantially fewer quantity of $2^{kf}$ functional states in kf functional state elements. As also described above, the particular configuration of $2^k$ states and $2^{kf}$ functional states in the obfuscation state machine 320 is derived from the value represented by the obfuscation code. As described above, the obfuscation code represents a unique value associated with the particular protected device 330 in the context of a particular board/system installation and manufacturing parameters. The obfuscation code for a particular protected system 330 is transferred to and used by the IP owner to generate the authentication key for the particular protected device 330. Because the particular configuration of states and functional states in the obfuscation state machine 320 is derived from the obfuscation code, the authentication key can be mathematically related to the obfuscation code and thus related to the particular configuration of states and functional states in the obfuscation state machine 320. As a result, the authentication key generated by the IP owner can represent a mapping or a particular sequence or pattern of state transitions to cause the obfuscation state machine 320 to transition from the initial obfuscation state, through zero or more intermediate states, to a functional reset state for the protected system 330. The authentication key can be provided or programmed into the obfuscation state machine 320 of the obfuscation unit 300. Thus, the protected system 330 is unlocked with the authentication key and can transition from the initial obfuscation state to a functional reset state from which the protected system 330 can begin secure, normal operation. In a particular embodiment, the authentication key may also specify the required number c of clock cycles to be used for the protected system 330 to move from the obfuscated state to the functional state. The value of c in a particular embodiment can be a configurable parameter by the IP owner as part of the authentication key. Based on the value of c used in an embodiment, a step up/down counter with a base-line increment/decrement per clock can be created. This enables the obfuscation state machine 320 to transition across the number of states to reach the eventual functional reset state, all in the required number c of clock cycles.

In the event the number of obfuscated states $2^{ko}$ is very large (e.g., twelve orders of magnitude larger) compared to the quantity of functional states $2^{kf}$, the logic cone of input signals leading to the functional reset state will be very large, leading to potential circuit timing delay problems.

This issue can be mitigated by duplicating several functional reset states in place of one functional reset state. All of these functional reset states can be configured to converge and transition to other single or duplicated functional states. The use of replicated functional states and multiple functional reset states can overcome circuit timing delay problems caused by the use of a large quantity of obfuscated states $2^{ko}$ in various embodiments.

As described above, the obfuscation state machine 320 is configured to use the authentication key to cause transition from the initial obfuscation state, through intermediate states as specified by the number c of clock cycles, to one of potentially multiple functional reset states for the protected system 330. Once the obfuscation state machine 320 reaches a functional reset state, the obfuscation state machine 320 will thereafter transition only within the set of functional states, even after a hardware reset, and will never transition to a non-functional obfuscation state until the next power-on cycle. As a result, the obfuscation unit 300 is configured to securely cause the protected system 330 to reach a functional reset state and normal, secure operation thereafter. Once the protected system 330 transitions to a functional state, a Functional State Reached flag can be set to indicate the completion of the transition from the obfuscation state. This flag is available for other system components to verify that the protected device 330 has been properly authenticated. In a particular embodiment, it will take a minimum of 256 native, protected device clock cycles at the protected device clock speed to put the protected device into a secure, functional operational mode on every power-up cycle.

In an alternative embodiment, each of the state elements in the obfuscation state machine 320 can be configured to define more than two states. Instead of using conventional flip-flops that define only two states: 1) functional, or 2) non-functional, other multi-state devices may be used for the state elements in place of two-state flip-flops to define values corresponding to an arbitrary quantity of states, x, for each state element. In this embodiment, the use of k state elements would enable the configuration of $x^k$ states in the obfuscation state machine 320. Such an embodiment can substantially increase the quantity of obfuscation states relative to the quantity of functional states and provide an increased level of security.

Based on the inventive approach offered by the various embodiments described herein, several advantages can be realized. For example, one of the non-invasive techniques adapted to understand and reverse engineer a device has been to treat the device as a black-box, and observe its output (signals) response and behavior, when applying specific stimulus on its input signals. A normally functioning device will be able to give away quite a bit of its functionality on its outputs through an intelligently crafted small number of input test vectors. The system and method for authenticating and enabling functioning of a manufactured electronic device as described herein can be effectively used to thwart any such reverse engineering approach. The protected device, when in the non-functional obfuscation mode, will generate an obfuscation state, which can be used to affect critical output nodes of the protected device. This modification will in effect contaminate the hardware design using these node signals and will result in the generation of spurious and incorrect output signals. This signal contamination will render the protected device extremely difficult to reverse engineer.

Figure 5:
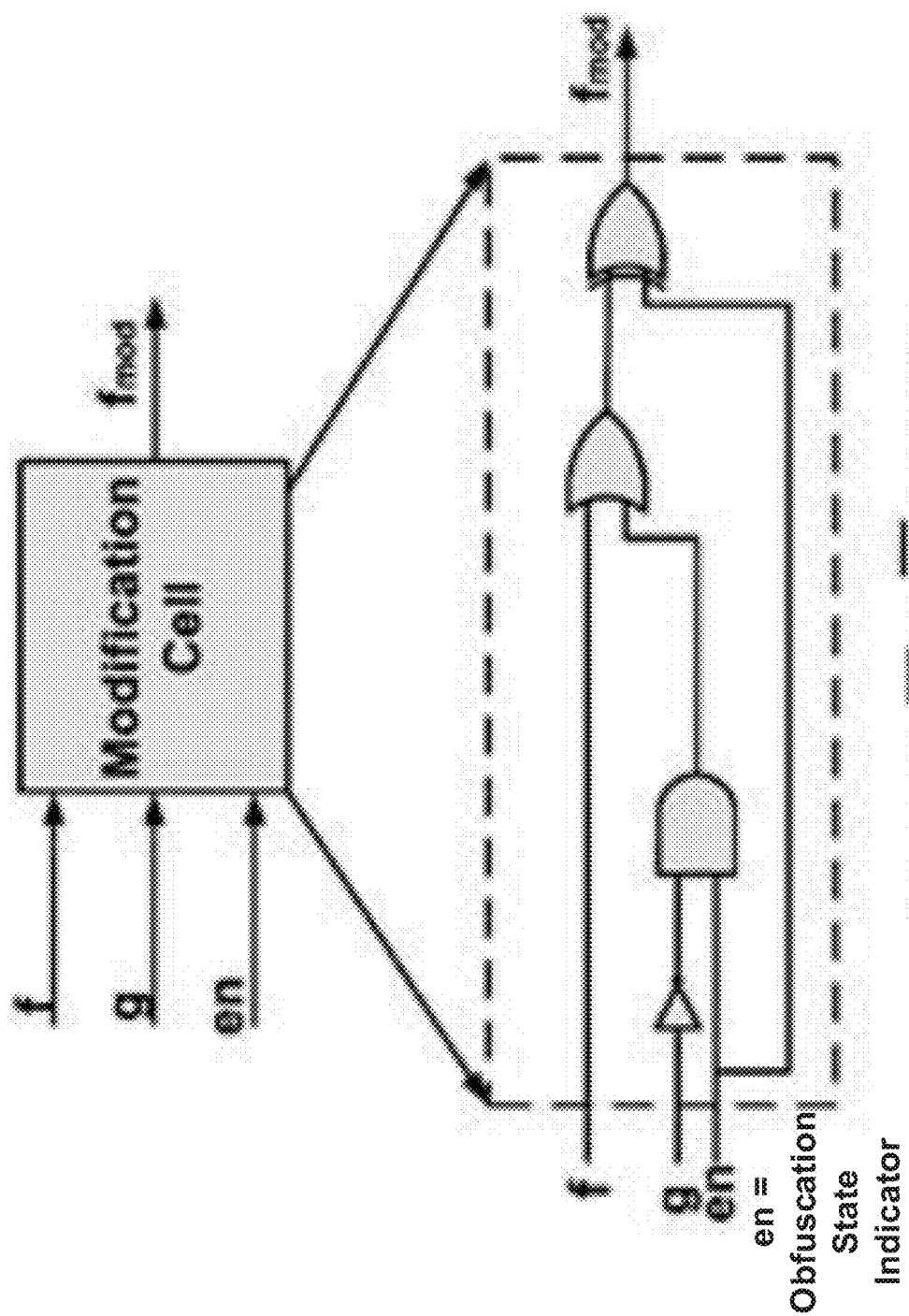
FIG. 5 illustrates a system and method in an example embodiment for modifying particular critical output nodes of the protected device.

FIG. 5 illustrates a system and method in an example embodiment for modifying particular critical output nodes of the protected device. As shown in FIG. 5, modification cells can be placed in the path of several carefully selected critical control signals in the protected device 330. In the example shown in FIG. 5:

'f' input corresponds to the original un-modified control signal.

'g' input corresponds to a signal generated from a large input cone of signals, which are not used in 'f' signal generation in the original design.

'en' input is the Obfuscation State indicator, which can be set (true) when the protected device is operating in an obfuscation state as described above.

When 'en'='0', fmod=f (which is the original functional behavior of the signal).

When 'en'='1', then:
$f_{mod}$=!f, if 'g'='1',
$f_{mod}$=f, if 'g'='0' (which is the original functional behavior of the signal).

In other words, in an obfuscation mode (en='1'), the original signal output is flipped frequently when, the signal 'g' from the input cone switches. Thus, the output will behave erratically in obfuscation mode, when inputs unrelated to the original functionality are switching. This signal contamination will render the protected device extremely difficult to reverse engineer and thus will protect the intellectual property in the device.

Figure 6:
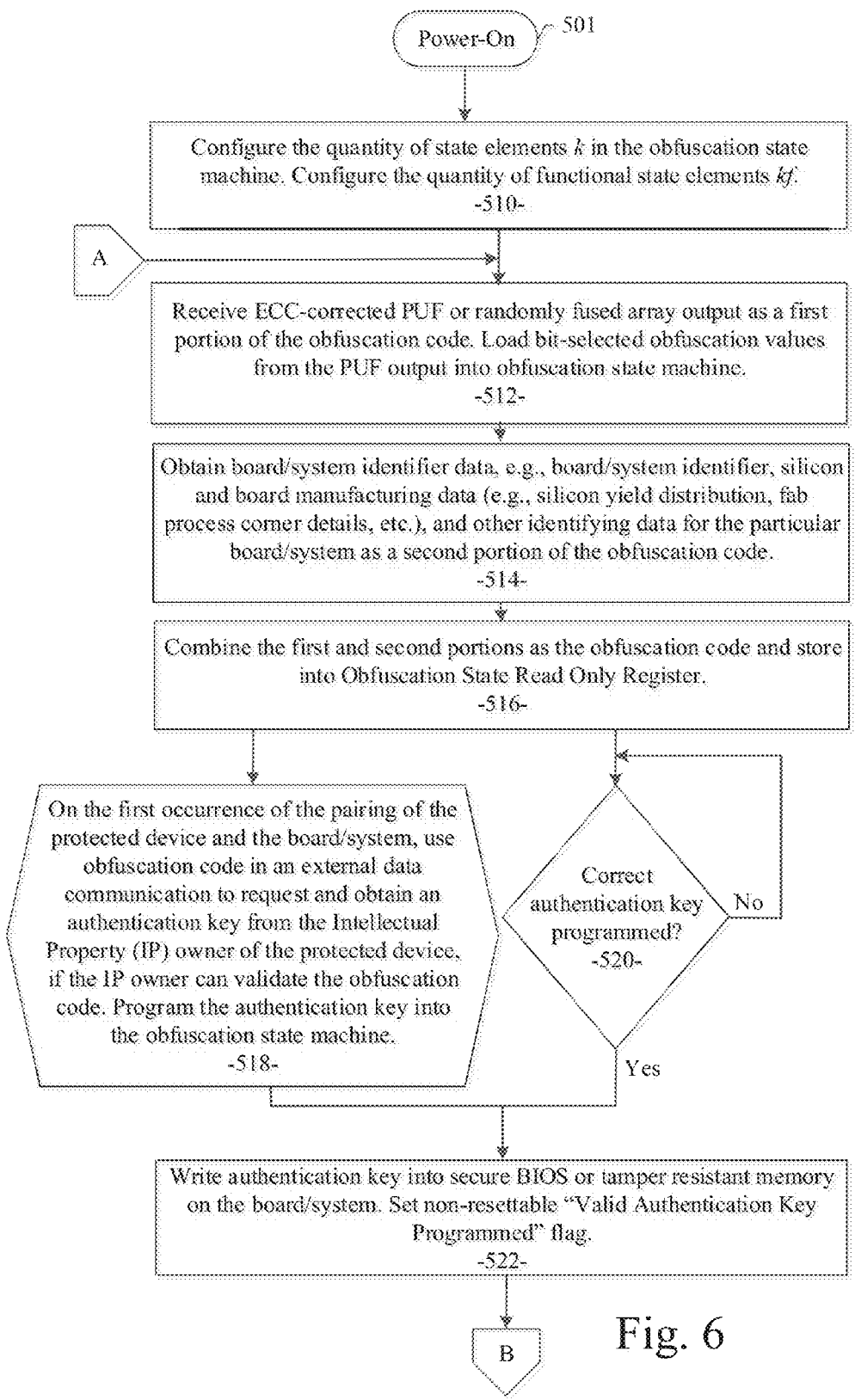
FIGS. 6 and 7 are flowcharts illustrating an example embodiment of methods as described herein.
Figure 7:
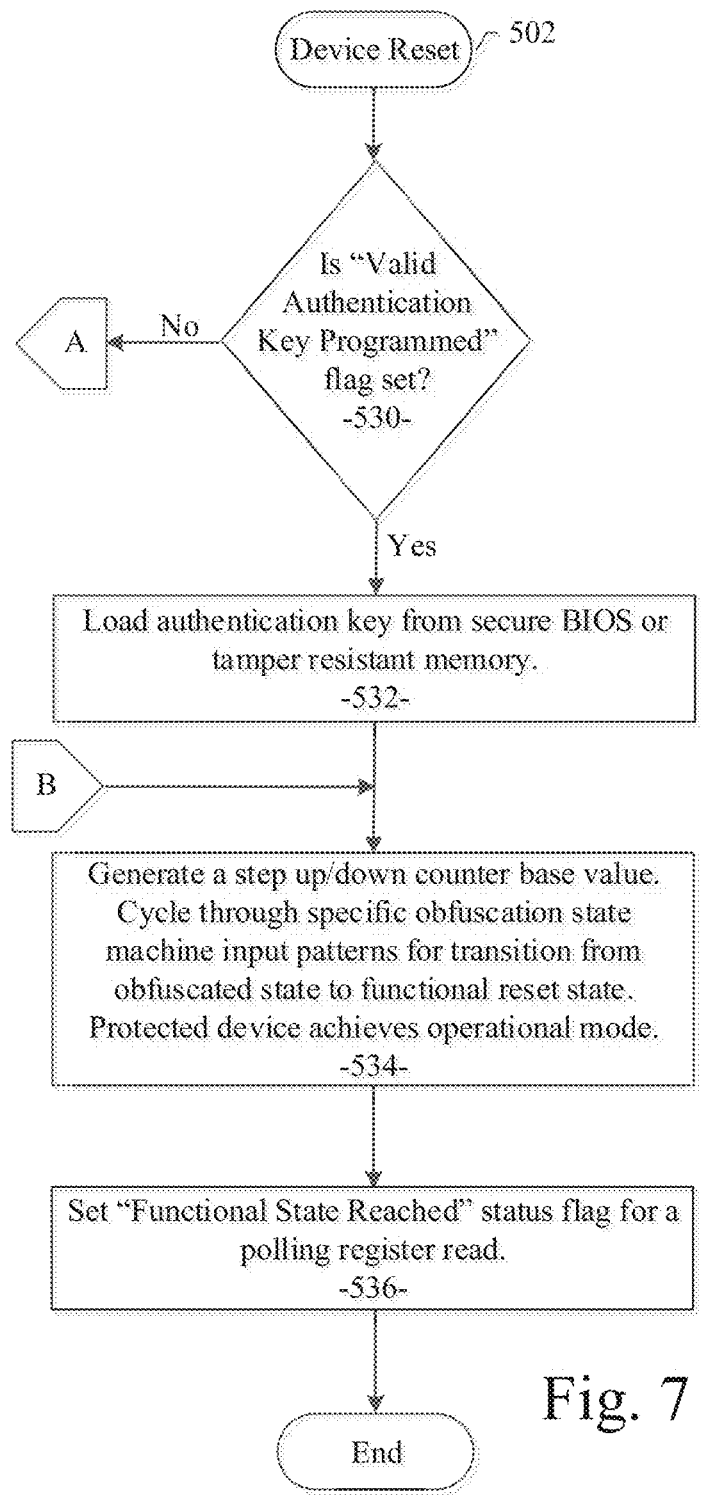

FIGS. 6 and 7 are flowcharts illustrating an example embodiment of methods as described herein. Referring to FIG. 6, a portion of the system configuration and processing performed in an example embodiment on power-up is shown. On initial power-on 501, the obfuscation state machine 320 of the obfuscation unit 300 can be configured with a desired quantity of state elements k and a desired quantity of functional state elements kf (processing block 510). The PUF 310 can be used to generate a first portion of the obfuscation code. The first portion of the obfuscation code from the PUF 310 output, which can be processed by an ECC correction block, or provided separately from a device-unique randomly fused array, can be received by the obfuscation unit 300. The bit-selected obfuscation values from the PUF/ECC, or randomly fused array output can be loaded into obfuscation state machine 320 as described above (processing block 512). Once the first portion of the obfuscation code is obtained from the PUF/ECC or randomly fused array 310, a second portion of the obfuscation code can be obtained from board/system identifier data including, a board/system identifier, silicon and board manufacturing data (e.g., silicon yield distribution, fab process corner details, etc.), and other identifying data associated with the pairing of the protected device 330 and the particular board/system 305 (processing block 514). The first and second portions of the obfuscation code can be combined to form the obfuscation code and the obfuscation code can be stored into an Obfuscation State Read Only Register (processing block 516). On the first occurrence of the pairing of the protected device 330 and the board/system, the obfuscation code can be used in an external data communication to request and obtain an authentication key from the Intellectual Property (IP) owner of the protected device, if the IP owner can validate the obfuscation code from the protected device 330. The received authentication key can be programmed into the obfuscation state machine 320 (processing block 518). On subsequent usage of the paired protected device 330 and board/system 305, the previously received authentication key can be validated in decision block 520. If the correct and valid authentication key has been previously programmed into the obfuscation state machine 320, processing continues at processing block 522. If an incorrect or invalid authentication key is programmed into the obfuscation state machine 320, the obfuscation unit 300 processing loops until a valid authentication key is provided. The hardware may choose to indicate the error situation through an error code, which a secure device driver can use to communicate authentication failure to the protected device user. When the correct and valid authentication key has been programmed into the obfuscation state machine 320, the valid authentication key is stored into secure BIOS or tamper resistant memory on the board/system 305. A non-resettable "Valid Authentication Key Programmed" flag is set to indicate the presence of the valid authentication key (processing block 522). Processing continues at the label B shown in FIG. 7.

Referring now to FIG. 7, a portion of the system configuration and processing performed in an example embodiment on protected device reset is shown. On device reset 502, the obfuscation unit 300 can query the Valid Authentication Key Programmed flag to determine the presence of a valid authentication key in the obfuscation state machine 320 (decision block 530). If the Valid Authentication Key Programmed flag indicates that a valid authentication key has not been programmed into the obfuscation state machine 320, processing continues at the label A shown in FIG. 6 and described above. If the Valid Authentication Key Programmed flag indicates that a valid authentication key has been programmed into the obfuscation state machine 320, processing continues at processing block 532. At processing block 532, the valid authentication key can be retrieved from secure BIOS or tamper resistant memory. A step-up/down counter base value is generated in processing block 534. The valid authentication key can be used to cause the obfuscation state machine 320 to cycle through specific input patterns for transition from an initial obfuscated state to a functional reset state. In this case, the protected device 330 achieves a functional, operational mode (processing block 534). A Functional State Reached status flag is set to indicate the transition to a functional state (processing block 536). The Functional State Reached status flag is available for a polling register read by other system components. Processing for the example embodiment terminates at the End bubble shown in FIG. 7.

The disclosed embodiments can be used with a wide variety of electronic devices, such as desktop computing platforms, mobile computing platforms, mobile devices, mobile systems, smartphone, portable devices, wearables, all-in-one desktop devices, portable-all-in-one devices (pAIO), laptop computers, handheld computers, touch screen systems, network devices, routers, servers, set-top boxes, Supervisory Control and Data Acquisition (SCADA) systems, Internet of Things (IoT) devices and sensors, and a variety of other electronic devices.

In some embodiments, protected device 330 may include hardware logic, firmware logic, or software logic. Examples of such logic may include but are not limited to executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein. In some embodiments, at least a portion of the logic can be implemented in hardware or firmware.

Although not shown, protected device 330 may further include one or more device resources commonly implemented for electronic devices, such as various computing and communications platform hardware and software components typically implemented by a personal electronic device. Some examples of device resources may include without limitation a co-processor, a graphics processing unit (GPU), a central processing unit (CPU), a microcontroller unit (MCU), dedicated fixed function hardware, a chipset/platform control logic, an input/output (I/O) device, computer-readable media, network interfaces, portable power supplies (e.g., a battery), application programs, system programs, Secure BIOS and so forth. The example embodiments described herein are not limited in this respect.

Included herein is a set of logic flows representative of example methodologies for performing novel aspects of the disclosed architecture. While, for purposes of simplicity of explanation, the one or more methodologies shown herein are shown and described as a series of acts, those of ordinary skill in the art will understand and appreciate that the methodologies are not limited by the order of acts. Some acts may, in accordance therewith, occur in a different order and/or concurrently with other acts from those shown and described herein. For example, those of ordinary skill in the art will understand and appreciate that a methodology could alternatively be represented as a series of interrelated states or events, such as in a state diagram. Moreover, not all acts illustrated in a methodology may be required for a novel implementation. A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The example embodiments disclosed herein are not limited in this respect.

The various elements of the example embodiments as previously described with reference to the figures may include various hardware elements, software elements, or a combination of both. Examples of hardware elements may include devices, logic devices, components, processors, microprocessors, circuits, processors, dedicated hardware, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), custom integrated circuits (IC), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The example embodiments described herein provide a technical solution to a technical problem. The various embodiments improve the functioning of the electronic device by providing systems and methods for protecting the intellectual property and design structures and methodologies in an electronic device. The various embodiments also serve to transform the state of various system components based on a dynamically determined system context. Additionally, the various embodiments effect an improvement in a variety of technical fields including the fields of dynamic data processing, security, trusted computing, device fabrication, information sharing, and intellectual property and design protection.

Figure 8:
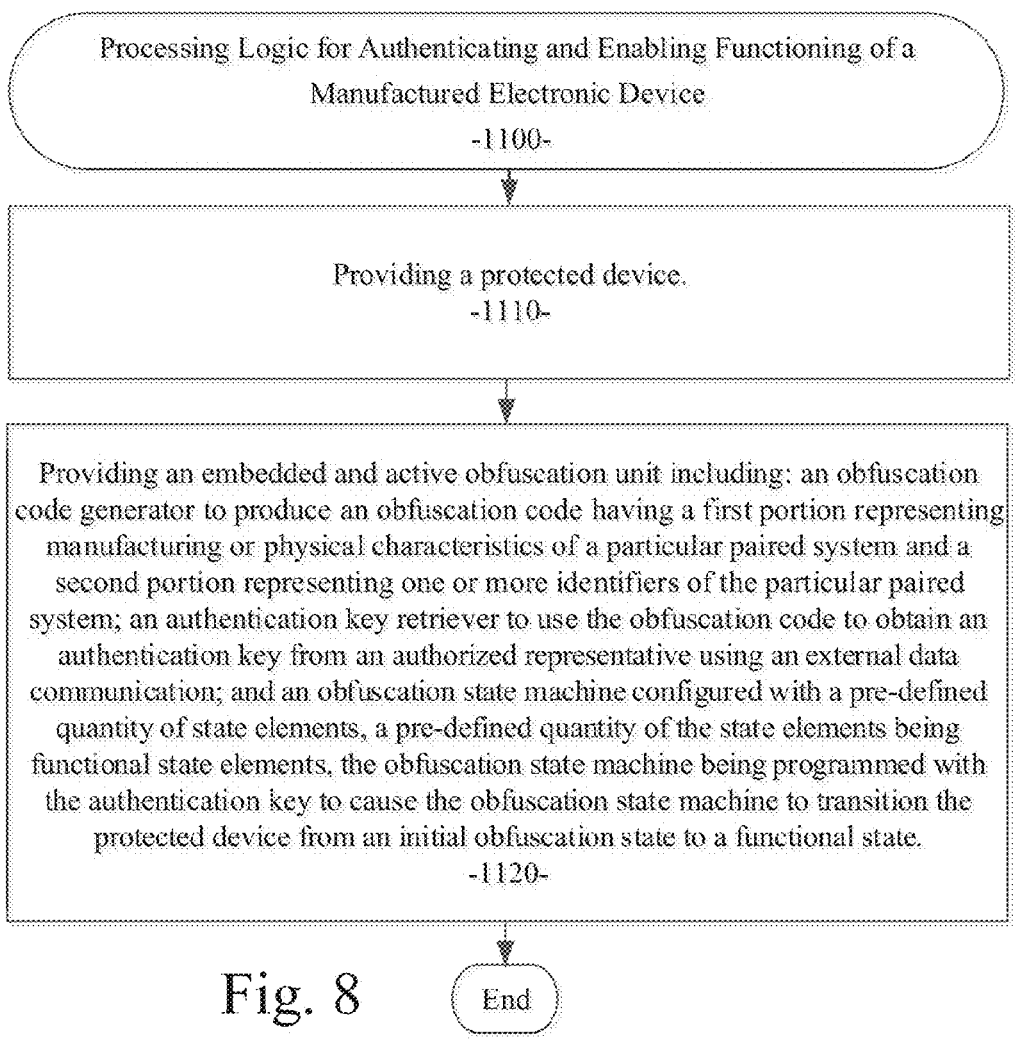
FIG. 8 is a processing flow chart illustrating an example embodiment of a method as described herein.

Referring now to FIG. 8, a processing flow diagram illustrates an example embodiment of a method 1100 as described herein. The method 1100 of an example embodiment includes: providing a protected device (processing block 1110); and providing an embedded and active obfuscation unit including: an obfuscation code generator to produce an obfuscation code having a first portion representing manufacturing or physical characteristics of a particular paired system and a second portion representing one or more identifiers of the particular paired system; an authentication key retriever to use the obfuscation code to obtain an authentication key from an authorized representative using an external data communication; and an obfuscation state machine configured with a pre-defined quantity of state elements, a pre-defined quantity of the state elements being functional state elements, the obfuscation state machine being programmed with the authentication key to cause the obfuscation state machine to transition the protected device from an initial obfuscation state to a functional state (processing block 1120).

Figure 9:
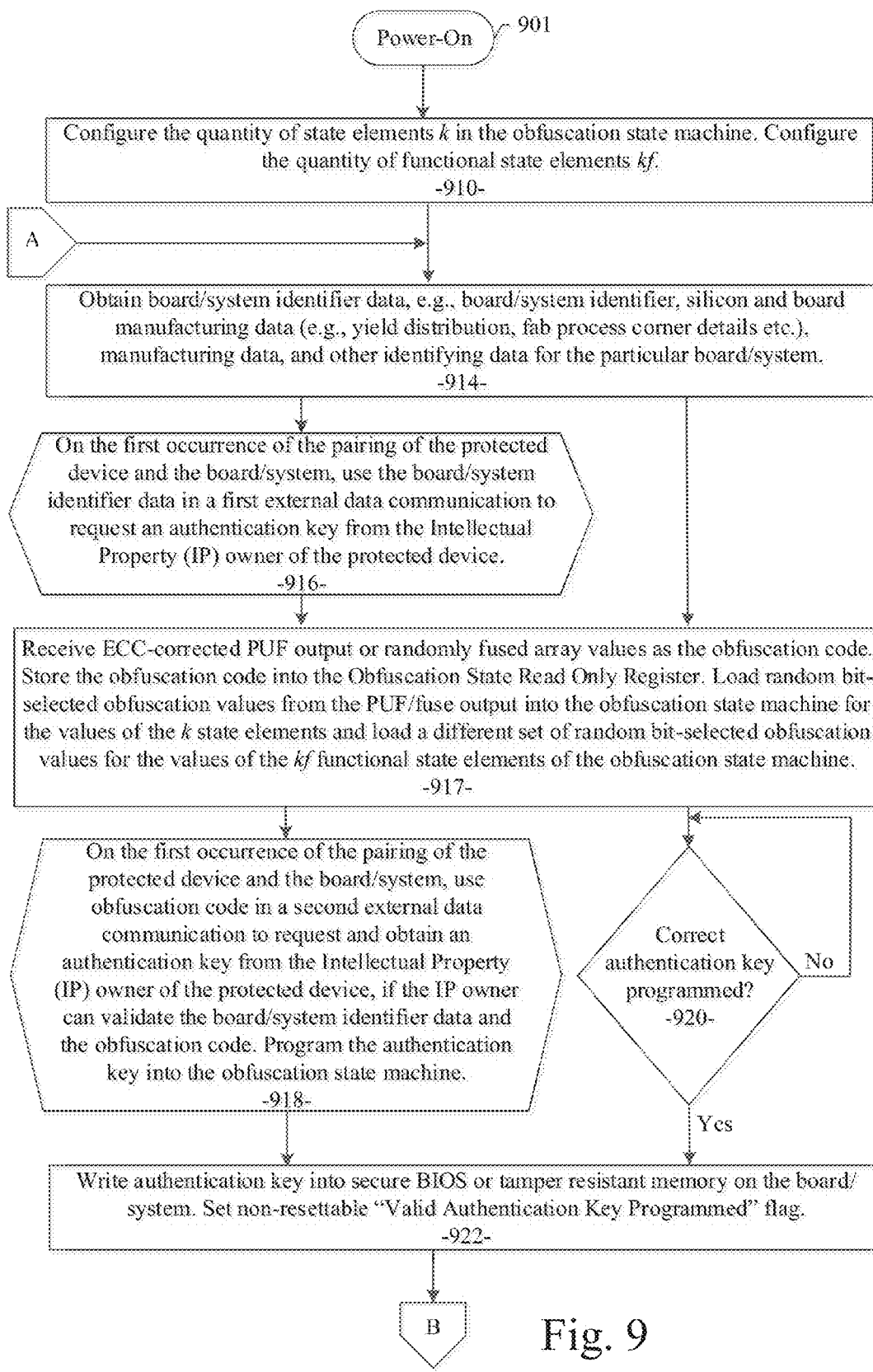
FIG. 9 is a flowchart illustrating an alternative embodiment of the methods as described herein.

FIG. 9 is a flowchart illustrating an alternative embodiment of the methods as described herein. Referring to FIG. 9, a portion of the system configuration and processing performed in an example embodiment on power-up is shown. On initial power-on 901, the obfuscation state machine 320 of the obfuscation unit 300 can be configured with a desired quantity of state elements k and a desired quantity of functional state elements kf (processing block 910). In processing block 914, a set of board/system identifier data can be obtained, which defines a context for the pairing of the protected device 330 and the particular board/system 305. The board/system identifier data can include a board/system identifier, silicon and board manufacturing data (e.g., yield distribution, fab process corner details etc.), manufacturing data, and other identifying data associated with the pairing of the protected device 330 and the particular board/system 305 (processing block 914). On the first occurrence of the pairing of the protected device 330 and the board/system 305, the board/system identifier data can be used in a first external data communication to request an authentication key from the Intellectual Property (IP) owner of the protected device 330 (processing block 916). In processing block 917, the obfuscation unit 300 can receive an ECC-corrected PUF 310 output or randomly fused array values as an obfuscation code. This data can be stored as the obfuscation code into Obfuscation State Read Only Register (processing block 917). Additionally, two sets of random bit-selected obfuscation values from the PUF 310/random fuse output as described above can be loaded into the obfuscation state machine 320 to constitute the values fork state elements and kf functional state elements of the obfuscation state machine 320 (processing block 917). On the first occurrence of the pairing of the protected device 330 and the board/system 305, the obfuscation code can be used in a second external data communication to request and obtain an authentication key from the Intellectual Property (IP) owner of the protected device 330, if the IP owner can first validate the board/system identifier data and the obfuscation code from the protected device 330. The received authentication key can be programmed into the obfuscation state machine 320 (processing block 918). On subsequent usage of the paired protected device 330 and board/system 305, the previously received authentication key can be validated in decision block 920. If the correct and valid authentication key has been previously programmed into the obfuscation state machine 320, processing continues at processing block 922. If an incorrect or invalid authentication key is programmed into the obfuscation state machine 320, the obfuscation unit 300 processing loops until a valid authentication key is provided. The hardware may choose to indicate the error situation through an error code, which a secure device driver can use to communicate authentication failure to the protected device user. The device user can attempt to correct the situation causing the error and attempt another authentication key request with the IP Owner. When the correct and valid authentication key has been programmed into the obfuscation state machine 320, the valid authentication key is stored into secure BIOS or tamper resistant memory on the board/system 305. A non-resettable "Valid Authentication Key Programmed" flag is set to indicate the presence of the valid authentication key (processing block 922). Processing continues at the label B shown in FIG. 7.

Referring now to FIG. 10, a processing flow diagram illustrates an alternative embodiment of a method 1150 as described herein. The method 1150 of an alternative embodiment includes: providing a protected device (processing block 1160); and providing an embedded and active obfuscation unit including: an obfuscation code generator to make available a device internal specific PUF/ECC or randomly fused data-based obfuscation code, and to provide a separate information procurer to obtain board/system identifier data of a particular paired system, the board/system identifier data representing manufacturing or physical characteristics of the particular paired system; an authentication key retriever to use the board/system identifier data to request an authentication key from an authorized representative in a first external communication, and to use the obfuscation code to request and obtain the authentication key from the authorized representative in a second external communication; and an obfuscation state machine configured with a pre-defined quantity of state elements, a pre-defined quantity of the state elements being functional state elements, the obfuscation state machine being programmed with the authentication key to cause the obfuscation state machine to transition the protected device from an initial obfuscated non-functional state to a functional state (processing block 1170).

It will be apparent to those of ordinary skill in the art in view of the disclosure herein that the method steps or processing operations described above may be performed in alternative sequences. For example, another alternative embodiment may use the obfuscation code to request an authentication key from an authorized representative in a first external communication and then may use the board/system identifier data to request the authentication key from the authorized representative in a second external communication.

Figure 11:
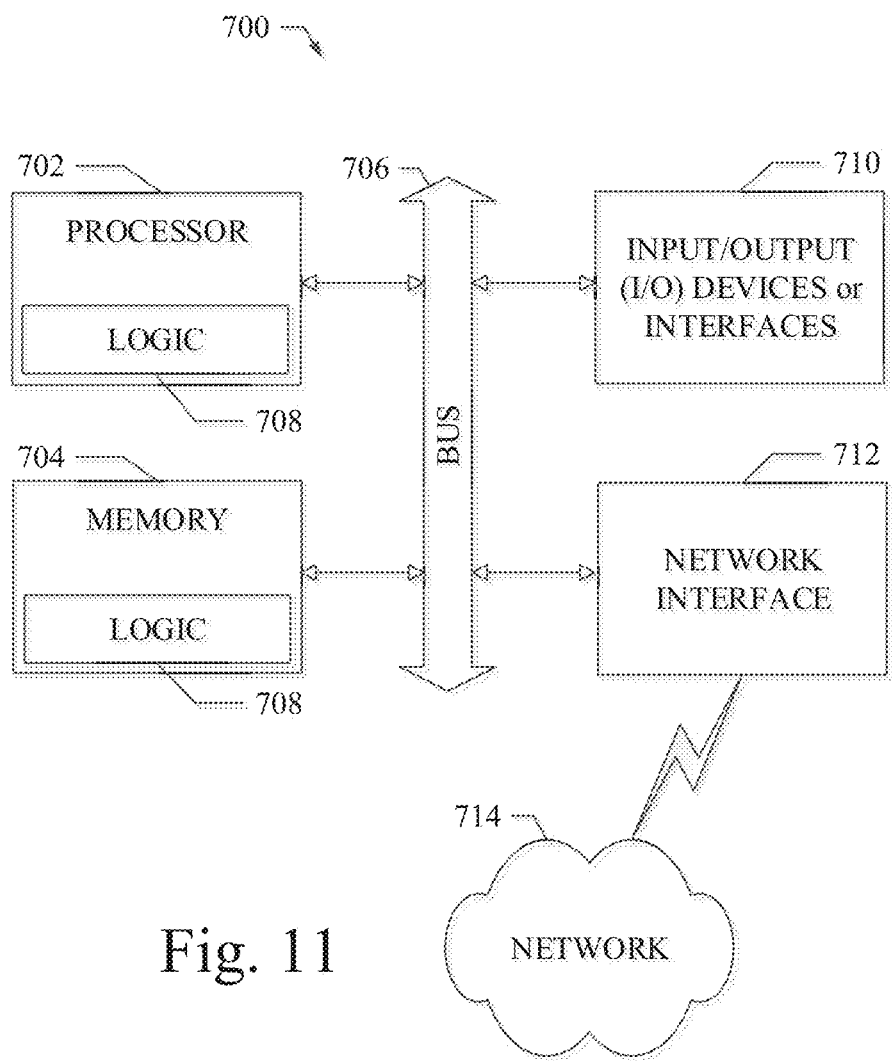
FIG. 11 shows a diagrammatic representation of a machine in the example form of a computing and/or communication system within which a set of instructions when executed and/or processing logic when activated may cause the machine to perform any one or more of the methodologies described and/or claimed herein.

FIG. 11 shows a diagrammatic representation of a machine in the example form of an electronic device, such as a computing and/or communication system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example mobile computing and/or communication system 700 includes a data processor 702 (e.g., a System-on-a-Chip [SoC], general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a display device or network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth, IEEE 802.11x, and the like. In essence, network interface 712 may include or support virtually any wired and/or wireless communication mechanisms by which information may travel between the computing and/or communication system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. This also includes Tamper Resistant Flash (TRF) and Trusted Platform Modules (TPM). The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware or firmware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

With general reference to notations and nomenclature used herein, the description presented herein may be disclosed in terms of program procedures executed on a computer or a network of computers. These procedural descriptions and representations may be used by those of ordinary skill in the art to convey their work to others of ordinary skill in the art.

A procedure is generally conceived to be a self-consistent sequence of operations performed on electrical, magnetic, or optical signals capable of being stored, transferred, combined, compared, and otherwise manipulated. These signals may be referred to as bits, values, elements, symbols, characters, terms, numbers, or the like. It should be noted, however, that all of these and similar terms are to be associated with the appropriate physical quantities and are merely convenient labels applied to those quantities. Further, the manipulations performed are often referred to in terms such as adding or comparing, which operations may be executed by one or more machines. Useful machines for performing operations of various embodiments may include general-purpose digital computers or similar devices. Various embodiments also relate to apparatus or systems for performing these operations. This apparatus may be specially constructed for a purpose, or it may include a general-purpose computer as selectively activated or reconfigured by a computer program stored in the computer. The procedures presented herein are not inherently related to a particular computer or other apparatus. Various general-purpose machines may be used with programs written in accordance with teachings herein, or it may prove convenient to construct more specialized apparatus to perform methods described herein.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An embedded active obfuscation unit comprising:
   an obfuscation code generator to produce an obfuscation code having a first portion representing manufacturing or physical characteristics of a particular paired system and a second portion representing one or more identifiers of the particular paired system, the obfuscation code generator to use the obfuscation code to obtain an authentication key; and
   an obfuscation state machine configured with a pre-defined quantity of state elements, a pre-defined quantity of the state elements being functional state elements, the obfuscation state machine being programmed with the authentication key and portions of the obfuscation code to cause the obfuscation state machine to transition a protected device from an initial obfuscation state to a functional state, the protected device transitioning from the initial obfuscation state through a set of obfuscation states before reaching the functional state for normal operation.

2. The embedded active obfuscation unit of claim 1 wherein the first portion of the obfuscation code is generated by a physical unclonable function (PUF) device.

3. The embedded active obfuscation unit of claim 1 wherein the first portion of the obfuscation code is generated by a randomly fused array.

4. The embedded active obfuscation unit of claim 1 wherein the second portion of the obfuscation code is board/system identifier data including a board/system identifier and silicon or board manufacturing data.

5. The embedded active obfuscation unit of claim 1 wherein the authentication key is obtained from a representative of an owner of the protected device.

6. An embedded active obfuscation unit comprising:
   an obfuscation code generator to make available a device internal specific obfuscation code, to obtain board/system identifier data of a particular paired system, the board/system identifier data representing manufacturing or physical characteristics of the particular paired system, and to use the board/system identifier data to obtain an authentication key; and
   an obfuscation state machine configured with a pre-defined quantity of state elements, a pre-defined quantity of the state elements being functional state elements, the obfuscation state machine being programmed with the authentication key and portions of the obfuscation code to cause the obfuscation state machine to transition a protected device from an initial obfuscation state to a functional state, the protected device transitioning from the initial obfuscation state through a set of obfuscation states before reaching the functional state for normal operation.

7. The embedded active obfuscation unit of claim 6 wherein the obfuscation code is generated by a physical unclonable function (PUF) device.

8. The embedded active obfuscation unit of claim 6 wherein the obfuscation code is generated by a randomly fused array.

9. The embedded active obfuscation unit of claim 6 wherein the board/system identifier data including a board/system identifier and silicon or board manufacturing data.

10. The embedded active obfuscation unit of claim 6 wherein the authentication key is obtained from a representative of an owner of the protected device.

11. A method comprising:
    using an obfuscation code generator to produce an obfuscation code having a first portion representing manufacturing or physical characteristics of a particular paired system and a second portion representing one or more identifiers of the particular paired system;
    using the obfuscation code to obtain an authentication key; and
    using an obfuscation state machine configured with a pre-defined quantity of state elements, a pre-defined quantity of the state elements being functional state elements, the obfuscation state machine being programmed with the authentication key and portions of the obfuscation code to cause the obfuscation state machine to transition the protected device from an initial obfuscation state to a functional state, the protected device transitioning from the initial obfuscation state through a set of obfuscation states before reaching the functional state for normal operation.

12. The method of claim 11 wherein the first portion of the obfuscation code is generated by a physical unclonable function (PUF) device.

13. The method of claim 11 wherein the first portion of the obfuscation code is generated by a randomly fused array.

14. The method of claim 11 wherein the second portion of the obfuscation code is board/system identifier data including a board/system identifier and silicon or board manufacturing data.

15. The method of claim 11 wherein the authentication key is obtained from a representative of an owner of the protected device.

16. A method comprising:
    using an obfuscation code generator to make available a device internal specific obfuscation code, to obtain board/system identifier data of a particular paired system, the board/system identifier data representing manufacturing or physical characteristics of the particular paired system, and to use the board/system identifier data to obtain an authentication key;
    using an obfuscation state machine configured with a pre-defined quantity of state elements, a pre-defined quantity of the state elements being functional state elements, the obfuscation state machine being programmed with the authentication key and portions of the obfuscation code to cause the obfuscation state machine to transition the protected device from an initial obfuscation state to a functional state, the protected device transitioning from the initial obfuscation state through a set of obfuscation states before reaching the functional state for normal operation.

17. The method of claim 16 wherein the first portion of the obfuscation code is generated by a physical unclonable function (PUF) device.

18. The method of claim 16 wherein the first portion of the obfuscation code is generated by a randomly fused array.

19. The method of claim 16 wherein the second portion of the obfuscation code is board/system identifier data including a board/system identifier and silicon or board manufacturing data.

20. The method of claim 16 wherein the authentication key is obtained from a representative of an owner of the protected device.

* * * * *